(12) United States Patent
Topolkaraev et al.

(10) Patent No.: US 10,286,593 B2
(45) Date of Patent: May 14, 2019

(54) THERMOFORMED ARTICLE FORMED FROM A POROUS POLYMERIC SHEET

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Brent M. Thompson, Oshkosh, WI (US); Duane L. McDonald, Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 15/124,364

(22) PCT Filed: Jun. 4, 2015

(86) PCT No.: PCT/US2015/034158
§ 371 (c)(1),
(2) Date: Sep. 8, 2016

(87) PCT Pub. No.: WO2015/187924
PCT Pub. Date: Dec. 10, 2015

(65) Prior Publication Data
US 2017/0080628 A1 Mar. 23, 2017

Related U.S. Application Data

(60) Provisional application No. 62/008,697, filed on Jun. 6, 2014.

(51) Int. Cl.
*B29C 51/00* (2006.01)
*B29C 51/10* (2006.01)
(Continued)

(52) U.S. Cl.
CPC ............ *B29C 51/002* (2013.01); *B29C 51/02* (2013.01); *B29C 51/10* (2013.01); *B29C 51/268* (2013.01);
(Continued)

(58) Field of Classification Search
CPC ........ B29C 51/002; B29C 51/42; B29C 51/10
(Continued)

(56) References Cited

U.S. PATENT DOCUMENTS 2,972,349 A 2/1961 De Wall
3,354,506 A 11/1967 Raley
(Continued)

FOREIGN PATENT DOCUMENTS

EP 0348887 A2 1/1990
EP 0348887 A3 1/1990
(Continued)

OTHER PUBLICATIONS

Lee et al., "Development of Discrete Nanopores 1: Tension of Polypropylene/Polyethylene Copolymer Blends," *Journal of Applied Polymer Science*, vol. 91, No. 6, Mar. 15, 2004, pp. 3462-3650.
(Continued)

*Primary Examiner* — Tahseen Khan
(74) *Attorney, Agent, or Firm* — Dority & Manning, P.A.

(57) ABSTRACT

A thermoformed article that is formed from a polymeric sheet having a thickness of from about 0.1 to about 100 millimeters is provided. The polymeric sheet contains a thermoplastic composition that includes a continuous phase that includes a matrix polymer. A microinclusion additive and nanoinclusion additive are dispersed within the continuous phase in the form of discrete domains, and a porous network is defined in the composition that includes a plurality of nanopores having an average cross-sectional dimension of about 800 nanometers or less.

29 Claims, 9 Drawing Sheets

(51) Int. Cl.
  *B29C 51/26* (2006.01)
  *B29C 51/42* (2006.01)
  *C08J 9/00* (2006.01)
  *B29C 51/02* (2006.01)
  *B29K 105/04* (2006.01)
  *B29K 67/00* (2006.01)
  *B29K 105/00* (2006.01)
  *B29K 105/16* (2006.01)

(52) U.S. Cl.
  CPC ............ *B29C 51/42* (2013.01); *C08J 9/0061* (2013.01); *B29K 2067/003* (2013.01); *B29K 2067/046* (2013.01); *B29K 2105/0005* (2013.01); *B29K 2105/04* (2013.01); *B29K 2105/041* (2013.01); *B29K 2105/162* (2013.01); *B29K 2105/256* (2013.01); *C08J 2205/042* (2013.01); *C08J 2205/044* (2013.01); *C08J 2323/12* (2013.01); *C08J 2367/00* (2013.01); *C08J 2367/04* (2013.01); *C08J 2423/12* (2013.01); *C08J 2425/08* (2013.01); *C08J 2433/14* (2013.01); *C08J 2467/04* (2013.01)

(58) Field of Classification Search
  USPC ........................................................ 428/220
  See application file for complete search history.

(56) References Cited

U.S. PATENT DOCUMENTS

| | | | |
|---|---|---|---|
| 3,373,876 | A | 3/1968 | Stewart |
| 3,423,255 | A | 1/1969 | Joyce |
| 3,650,649 | A | 3/1972 | Schippers |
| 3,801,429 | A | 4/1974 | Schrenk et al. |
| 3,802,817 | A | 4/1974 | Matsuki et al. |
| 3,855,046 | A | 12/1974 | Hansen et al. |
| 4,031,012 | A | 6/1977 | Gics |
| 4,041,203 | A | 8/1977 | Brock et al. |
| 4,100,324 | A | 7/1978 | Anderson et al. |
| 4,282,735 | A | 8/1981 | Break |
| 4,374,888 | A | 2/1983 | Bornslaeger |
| 4,405,688 | A | 9/1983 | Lowery et al. |
| 4,557,132 | A | 12/1985 | Break |
| 4,698,372 | A | 10/1987 | Moss |
| 4,704,116 | A | 11/1987 | Enloe |
| 4,708,800 | A | 11/1987 | Ichikawa et al. |
| 4,766,029 | A | 8/1988 | Brock et al. |
| 4,789,699 | A | 12/1988 | Kieffer et al. |
| 4,797,468 | A | 1/1989 | De Vries |
| 4,798,603 | A | 1/1989 | Meyer et al. |
| 4,801,494 | A | 1/1989 | Datta et al. |
| 4,886,512 | A | 12/1989 | Damico et al. |
| 4,908,026 | A | 3/1990 | Sukiennik et al. |
| 4,937,299 | A | 6/1990 | Ewen et al. |
| 4,983,450 | A * | 1/1991 | Yanagihara ......... A61F 13/5148 427/245 |
| D315,990 | S | 4/1991 | Blenke et al. |
| 5,102,948 | A | 4/1992 | Deguchi et al. |
| 5,169,706 | A | 12/1992 | Collier, IV et al. |
| 5,179,164 | A | 1/1993 | Lausberg et al. |
| 5,192,606 | A | 3/1993 | Proxmire et al. |
| 5,213,881 | A | 5/1993 | Timmons et al. |
| 5,218,071 | A | 6/1993 | Tsutsui et al. |
| 5,248,309 | A | 9/1993 | Serbiak et al. |
| 5,254,111 | A | 10/1993 | Cancio et al. |
| 5,272,236 | A | 12/1993 | Lai et al. |
| 5,278,272 | A | 1/1994 | Lai et al. |
| 5,284,309 | A | 2/1994 | Salvatore et al. |
| 5,284,703 | A | 2/1994 | Everhart et al. |
| 5,322,728 | A | 6/1994 | Davey et al. |
| 5,350,624 | A | 9/1994 | Georger et al. |
| D358,035 | S | 5/1995 | Zander et al. |
| 5,464,688 | A | 11/1995 | Timmons et al. |
| 5,470,944 | A | 11/1995 | Bonsignore |
| 5,472,775 | A | 12/1995 | Obijeski et al. |
| 5,486,166 | A | 1/1996 | Bishop et al. |
| 5,490,846 | A | 2/1996 | Ellis et al. |
| 5,539,056 | A | 7/1996 | Yang et al. |
| 5,547,756 | A | 8/1996 | Kamo et al. |
| 5,558,659 | A | 9/1996 | Sherrod et al. |
| 5,571,619 | A | 11/1996 | McAlpin et al. |
| 5,596,052 | A | 1/1997 | Resconi et al. |
| 5,620,779 | A | 4/1997 | Levy et al. |
| 5,649,916 | A | 7/1997 | DiPalma et al. |
| 5,662,671 | A | 9/1997 | Barbut et al. |
| D384,508 | S | 10/1997 | Zander et al. |
| D384,819 | S | 10/1997 | Zander et al. |
| 5,695,376 | A * | 12/1997 | Datta ................. A61F 13/4702 442/334 |
| 5,695,868 | A | 12/1997 | McCormack |
| 5,702,377 | A | 12/1997 | Collier et al. |
| D390,708 | S | 2/1998 | Brown |
| 5,766,760 | A | 6/1998 | Tsai et al. |
| 5,770,682 | A | 6/1998 | Ohara et al. |
| 5,843,057 | A | 10/1998 | Oota et al. |
| 5,853,886 | A | 12/1998 | Pinnavaia et al. |
| 5,855,999 | A | 1/1999 | McCormack |
| 5,877,248 | A | 3/1999 | Beall et al. |
| 5,880,197 | A | 3/1999 | Beall et al. |
| 5,880,254 | A | 3/1999 | Ohara et al. |
| 5,931,823 | A | 8/1999 | Stokes et al. |
| 5,932,497 | A | 8/1999 | Morman et al. |
| 5,962,112 | A | 10/1999 | Haynes et al. |
| 5,968,643 | A | 10/1999 | Topolkaraev et al. |
| 5,997,981 | A | 12/1999 | McCormack et al. |
| 6,002,064 | A | 12/1999 | Kobylivker et al. |
| D418,305 | S | 1/2000 | Zander et al. |
| 6,015,764 | A | 1/2000 | McCormack et al. |
| 6,037,033 | A | 3/2000 | Hunter |
| 6,037,281 | A | 3/2000 | Mathis et al. |
| 6,060,638 | A | 5/2000 | Paul et al. |
| 6,071,451 | A | 6/2000 | Wang et al. |
| D428,267 | S | 7/2000 | Romano, III et al. |
| 6,090,325 | A | 7/2000 | Wheat et al. |
| 6,093,665 | A | 7/2000 | Sayovitz et al. |
| 6,096,014 | A | 8/2000 | Haffner et al. |
| 6,110,158 | A | 8/2000 | Kielpikowski |
| 6,111,163 | A | 8/2000 | McCormack et al. |
| 6,150,002 | A | 11/2000 | Varona |
| 6,214,933 | B1 | 4/2001 | Wang et al. |
| 6,268,048 | B1 | 7/2001 | Topolkaraey et al. |
| 6,326,458 | B1 | 12/2001 | Gruber et al. |
| 6,348,258 | B1 * | 2/2002 | Topolkaraev ......... B29C 55/005 428/317.9 |
| 6,368,990 | B1 | 4/2002 | Jennergren et al. |
| 6,380,445 | B1 | 4/2002 | Rietz et al. |
| 6,389,864 | B1 | 5/2002 | Chubb et al. |
| 6,455,161 | B1 | 9/2002 | Regnier et al. |
| 6,461,457 | B1 | 10/2002 | Taylor et al. |
| 6,485,446 | B1 | 11/2002 | Brother et al. |
| 6,500,563 | B1 | 12/2002 | Datta et al. |
| 6,511,465 | B1 | 1/2003 | Freiburger et al. |
| 6,582,810 | B2 | 6/2003 | Heffelfinger |
| 6,586,073 | B2 | 7/2003 | Perez et al. |
| 6,642,429 | B1 | 11/2003 | Carter et al. |
| 6,663,611 | B2 | 12/2003 | Blaney et al. |
| 6,716,203 | B2 | 4/2004 | Sorebo et al. |
| 6,812,272 | B2 | 11/2004 | Fischer |
| 6,824,680 | B2 | 11/2004 | Chandavasu et al. |
| 6,824,734 | B2 | 11/2004 | Boggs et al. |
| 6,846,532 | B1 | 1/2005 | Bensur |
| 6,888,044 | B2 | 5/2005 | Fell et al. |
| 7,097,904 | B2 | 6/2006 | Jameson |
| 7,141,168 | B2 | 11/2006 | Sakamoto et al. |
| 7,341,776 | B1 | 3/2008 | Milliren et al. |
| 7,551,898 | B2 | 6/2009 | Rafailovich et al. |
| 7,872,169 | B2 | 1/2011 | Ruiz et al. |
| 7,984,591 | B2 | 7/2011 | Cashin et al. |
| 7,998,579 | B2 | 8/2011 | Lin et al. |
| 8,105,682 | B2 | 1/2012 | Sun et al. |
| 8,168,292 | B2 | 5/2012 | Morin |
| 8,198,200 | B2 | 6/2012 | Autran et al. |

(56) References Cited

U.S. PATENT DOCUMENTS

| | | |
|---|---|---|
| 8,268,738 B2 | 9/2012 | McEneany et al. |
| 8,313,818 B2 | 11/2012 | Vo et al. |
| 8,323,258 B2 | 12/2012 | Dalal et al. |
| 8,323,837 B2 | 12/2012 | Nishida et al. |
| 8,334,327 B2 | 12/2012 | Kaufman et al. |
| 8,362,145 B2 | 1/2013 | Li et al. |
| 8,518,318 B2 | 8/2013 | Jacobs |
| 8,603,614 B2 | 12/2013 | Lam et al. |
| 8,722,804 B2 | 5/2014 | Lue et al. |
| 8,936,740 B2 | 1/2015 | Topolkaraev et al. |
| 9,345,802 B2 | 5/2016 | Reichardt et al. |
| 9,872,802 B2 | 1/2018 | Sitzmann et al. |
| 2003/0116462 A1 | 6/2003 | Sorebo et al. |
| 2004/0002273 A1 | 1/2004 | Fitting et al. |
| 2004/0060112 A1 | 4/2004 | Fell et al. |
| 2004/0078015 A1 | 4/2004 | Copat et al. |
| 2004/0170852 A1* | 9/2004 | Gustafson ............ B32B 5/18 428/500 |
| 2005/0054255 A1 | 3/2005 | Morman et al. |
| 2005/0059941 A1 | 3/2005 | Baldwin et al. |
| 2005/0119359 A1 | 6/2005 | Shelby et al. |
| 2005/0131370 A1 | 6/2005 | Hantke et al. |
| 2005/0245162 A1 | 11/2005 | McCormack et al. |
| 2006/0094810 A1 | 5/2006 | Kim et al. |
| 2007/0073255 A1 | 3/2007 | Thomas et al. |
| 2007/0264897 A1 | 11/2007 | Collias et al. |
| 2008/0152894 A1* | 6/2008 | Beihoffer ............ A61K 8/02 424/401 |
| 2009/0318884 A1 | 12/2009 | Meyer et al. |
| 2010/0068484 A1* | 3/2010 | Kaufman ............ B32B 27/20 428/212 |
| 2010/0092754 A1* | 4/2010 | Nishida ............ C08J 5/18 428/220 |
| 2010/0092793 A1 | 4/2010 | Aithani et al. |
| 2010/0121295 A1 | 5/2010 | Collias et al. |
| 2010/0178477 A1 | 7/2010 | Jacobs |
| 2010/0305529 A1 | 12/2010 | Ashton et al. |
| 2010/0313507 A1 | 12/2010 | Castro et al. |
| 2011/0091714 A1 | 4/2011 | Chen et al. |
| 2011/0136978 A1* | 6/2011 | Li ............ A47G 19/00 525/54.3 |
| 2011/0183563 A1 | 7/2011 | Ochi et al. |
| 2011/0252739 A1 | 10/2011 | Leeser et al. |
| 2011/0263776 A1 | 10/2011 | Debras et al. |
| 2012/0039975 A1 | 2/2012 | Lagaron Cabello et al. |
| 2012/0040185 A1 | 2/2012 | Topolkaraev et al. |
| 2012/0040582 A1* | 2/2012 | Topolkaraev ............ D01D 5/38 442/334 |
| 2012/0070644 A1* | 3/2012 | Kang ............ B01D 69/02 428/220 |
| 2012/0225272 A1 | 9/2012 | Costeux et al. |
| 2012/0231242 A1 | 9/2012 | Boyer et al. |
| 2012/0238682 A1 | 9/2012 | Yang et al. |
| 2012/0315454 A1 | 12/2012 | Wang et al. |
| 2012/0321856 A1 | 12/2012 | Afshari |
| 2014/0014546 A1 | 1/2014 | Sitzmann et al. |
| 2014/0044954 A1* | 2/2014 | Matsubara ............ B29C 44/04 428/318.8 |

FOREIGN PATENT DOCUMENTS

| | | |
|---|---|---|
| EP | 0609881 A1 | 8/1994 |
| EP | 0609881 A2 | 8/1994 |
| EP | 0609881 B1 | 8/1999 |
| EP | 1152025 A1 | 11/2001 |
| EP | 1152025 A4 | 11/2001 |
| EP | 1684685 | 9/2013 |
| WO | WO99/32272 A1 | 7/1999 |
| WO | WO2009/152021 A2 | 12/2009 |
| WO | WO2009/152021 A3 | 12/2009 |
| WO | WO2010/002669 A1 | 1/2010 |
| WO | WO2014/199268 | 12/2014 |
| WO | WO2014/199269 | 12/2014 |
| WO | WO2014/199270 | 12/2014 |
| WO | WO2014/199271 | 12/2014 |
| WO | WO2014/199273 | 12/2014 |
| WO | WO2014/199274 | 12/2014 |
| WO | WO2014/199275 | 12/2014 |
| WO | WO2014/199276 | 12/2014 |
| WO | WO2014/199277 | 12/2014 |
| WO | WO2014/199278 | 12/2014 |
| WO | WO2014/199279 | 12/2014 |
| WO | WO2015/116953 | 8/2015 |
| WO | WO2015/116958 | 8/2015 |
| WO | WO2015/116965 | 8/2015 |
| WO | WO2015/187198 | 12/2015 |

OTHER PUBLICATIONS

International Search Report and Written Opinion for PCT/US2015/034158, dated Aug. 19, 2015, 13 pages.
Related U.S. Patent Applications Form.

* cited by examiner

THERMOFORMED ARTICLE FORMED FROM A POROUS POLYMERIC SHEET

RELATED APPLICATION

The present application is the national stage entry of International Patent Application No. PCT/US2015/034158 having a filing date of Jun. 4, 2015, which claims priority to U.S. Patent Application Ser. No. 62/008,697 filed on Jun. 6, 2014, which are incorporated herein in their entirety by reference thereto.

BACKGROUND OF THE INVENTION

Thermoforming is a common technique used to form three-dimensional articles, such as trays, cups, signs, refrigerator door liners, and packages. In a typical thermoforming process, a thermoplastic sheet is initially heated to a temperature above the glass transition temperature so that it becomes pliable. The sheet is then shaped within a thermoforming mold and allowed to cool so that it can retain the desired shape. Thereafter, the molded sheet is cut and trimmed to yield the final thermoformed article. One of the general requirements of a successful thermoforming process is the use of thermoplastic polymers (e.g., polyesters) that are capable of retaining a relatively high degree of melt strength when heated. Unfortunately, polymers of this nature tend to be relatively expensive, and can lead to a significant increase in the total cost of the thermoforming process. For this reason, several attempts have been made to use gaseous blowing agents to create "foamed" sheet structures, thereby lowering the density of the material and, in turn, the polymer content. Unfortunately, the processability and tensile properties of the foamed structure are often compromised due to the uncontrolled pore size and distribution.

As such, a need currently exists for an improved polymeric sheet for use in thermoforming processes that can have a reduced amount of polymers, but yet still exhibit good properties.

SUMMARY OF THE INVENTION

In accordance with one embodiment of the present invention, a thermoformed article is disclosed that is formed from a polymeric sheet having a thickness of from about 0.1 to about 100 millimeters. The polymeric sheet contains a thermoplastic composition that includes a continuous phase that includes a matrix polymer. A microinclusion additive and nanoinclusion additive are dispersed within the continuous phase in the form of discrete domains, and a porous network is defined in the composition that includes a plurality of nanopores having an average cross-sectional dimension of about 800 nanometers or less.

In accordance with yet another embodiment of the present invention, a method for thermoforming an article is disclosed. The method comprises heating a polymeric sheet, such as described above, to a temperature above the glass transition temperature of the thermoplastic composition; supplying the heated polymeric sheet to a thermoforming mold; and shaping the polymeric sheet within the mold.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
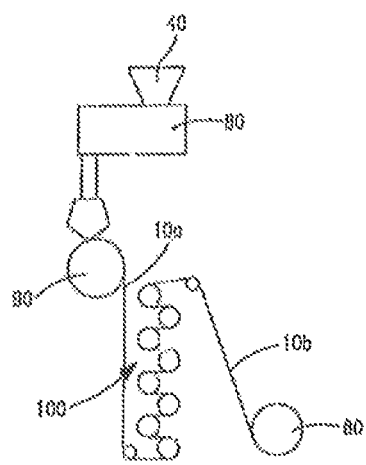
FIG. 1 is a schematic illustration of one embodiment for forming the polymeric sheet of the present invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a polymeric sheet for use in a thermoformed article. The thickness of the polymeric sheet typically ranges from about 0.1 to about 100 millimeters, in some embodiments from about 0.3 to about 60 millimeters, and in some embodiments, from about 0.5 to about 20 millimeters. Of course, the actual thickness may vary greatly depending on the intended application of the thermoformed article. For example, thin-gauge thermoforming is primarily employed in the manufacture of disposable cups, containers, lids, trays, blisters, clamshells, and other products for the food, medical, and general retail industries. In such instances, the thickness of the polymeric sheet may range from about 0.1 to about 2 millimeters, in some embodiments from about 0.2 to about 1.8 millimeters, and in some embodiments, from 0.3 to about 1.5 millimeters. On the other hand, thick-gauge thermoforming includes parts as diverse as vehicle door and dash panels, refrigerator liners, utility vehicle beds, and plastic pallets. In such instances, the thickness of the polymeric sheet may range from about 2 to about 100 millimeters, in some embodiments from about 3 to about 60 millimeters, and in some embodiments, from about 4 to about 20 millimeters.

Regardless of the thickness, the polymeric sheet contains a thermoplastic composition, which includes a continuous phase that includes a matrix polymer (e.g., polyester), and also contains a nanoinclusion additive that is at least partially incompatible with the matrix polymer so that it becomes dispersed within the continuous phase as discrete nano-scale phase domains. During drawing, when the composition is subjected to a deformation and elongational strain, the present inventors have discovered that these nano-scale phase domains are able to interact in a unique manner to create a network of pores. Namely, it is believed that elongational strain can initiate intensive localized shear zones and/or stress intensity zones (e.g., normal stresses) near the discrete phase domains as a result of stress concentrations that arise from the incompatibility of the materials. These shear and/or stress intensity zones cause some initial debonding in the matrix adjacent to the domains. Once initial pores are formed, the matrix located between domains can deform plastically to create internal stretched areas that locally narrow (or neck) and strain-harden. This process allows the formation of pores through the bulk of the composition that grow in the stretching direction, thereby leading to the formation of a porous network while the molecular orientation leads to strain-hardening that enhances mechanical strength.

Through the techniques noted above, a unique porous network may be formed so that the average percent volume occupied by the pores within a given unit volume of the composition may be from about 15% to about 80% per $cm^3$, in some embodiments from about 20% to about 70%, and in some embodiments, from about 30% to about 60% per cubic centimeter of the composition. With such a pore volume, the composition may have a relatively low density, such as about 1.4 grams per cubic centimeter ("$g/cm^3$") or less, in some embodiments about 1.2 $g/cm^3$ or less, in some embodiments from about 0.2 $g/cm^3$ to about 0.8 $g/cm^3$, and in some embodiments, from about 0.1 $g/cm^3$ to about 0.5 $g/cm^3$. A substantial portion of pores in the porous network are also of a "nano-scale" size ("nanopores"), such as those having an average cross-sectional dimension of about 800 nanometers or less, in some embodiments from about 1 to about 500 nanometers, in some embodiments from about 5 to about 400 nanometers, and in some embodiments from about 10 to about 100 nanometers. The term "cross-sectional dimension" generally refers to a characteristic dimension (e.g., width or diameter) of a pore, which is substantially orthogonal to its major axis (e.g., length) and also typically substantially orthogonal to the direction of the stress applied during drawing. The nanopores may also have an average axial dimension within the range of from about 100 to about 5000 nanometers, in some embodiments from about 50 to about 2000 nanometers, and in some embodiments, from about 100 to about 1000 nanometers. The "axial dimension" is the dimension in the direction of the major axis (e.g., length), which is typically in the direction of drawing. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the composition.

Besides a reduced density, the nanoporous structure may also provide a variety of additional different benefits to the resulting polymeric sheet. For example, such a structure can help restrict the flow of fluids through the sheet and be generally impermeable to fluids (e.g., liquid water), thereby allowing the sheet to insulate a surface from water penetration. In this regard, the polymeric sheet may have a relatively high hydrohead value of about 50 centimeters ("cm") or more, in some embodiments about 100 cm or more, in some embodiments, about 150 cm or more, and in some embodiments, from about 200 cm to about 1000 cm, as determined in accordance with ATTCC 127-2008. Other beneficial properties may also be achieved. For example, the resulting sheet may be generally permeable to water vapors. The permeability of the sheet to water vapor may characterized by its relatively high water vapor transmission rate ("WVTR"), which is the rate at which water vapor permeates through a sheet as measured in units of grams per meter squared per 24 hours ($g/m^2/24$ hrs). For example, the polymeric sheet may exhibit a WVTR of about 300 $g/m^2$-24 hours or more, in some embodiments about 500 $g/m^2$-24 hours or more, in some embodiments about 1,000 $g/m^2$-24 hours or more, and in some embodiments, from about 3,000 to about 15,000 $g/m^2$-24 hours, such as determined in accordance with ASTM E96/96M-12, Procedure B or INDA Test Procedure IST-70.4 (01).

Various embodiments of the present invention will now be described in more detail.

I. Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about 99 wt. %, in some embodiments from about 75 wt. % to about 98 wt. %, and in some embodiments, from about 80 wt. % to about 95 wt. % of the thermoplastic composition. The nature of the matrix polymer(s) used to form the continuous phase is not critical and any suitable polymer may generally be employed, such as polyesters, polyolefins, styrenic polymers, polyamides, etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

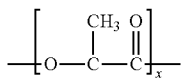

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.2 to about 20 grams per 10 minutes, and in some embodiments, from about 0.3 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm") or less, in some embodiments about 200 ppm or less, in some embodiments from about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive" generally refers to any amorphous, crystalline, or semi-crystalline material that is capable of being dispersed within the polymer matrix in the form of discrete domains of a microscale size. For example, prior to drawing, the domains may have an average cross-sectional dimension of from about 0.05 μm to about 30 μm, in some embodiments from about 0.1 μm to about 25 μm, in some embodiments from about 0.5 μm to about 20 μm, and in some embodiments from about 1 μm to about 10 μm. The term "cross-sectional dimension" generally refers to a characteristic dimension (e.g., width or diameter) of a domain, which is substantially orthogonal to its major axis (e.g., length) and also typically substantially orthogonal to the direction of the stress applied during drawing. While typically formed from the microinclusion additive, it should be also understood that the micro-scale domains may also be formed from a combination of the microinclusion and nanoinclusion additives and/or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the composition upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
ΔHv=heat of vaporization
R=Ideal Gas constant
T=Temperature
Vm=Molecular Volume The Hildebrand solubility parameters for many polymers are also available from the Solubility Handbook of Plastics, by Wyeych (2004), which is incorporated herein by reference.

The microinclusion additive may also have a certain melt flow rate (or viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 200 MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to drawing, the domains may have an average cross-sectional dimension of from about 1 to about 500 nanometers, in some embodiments from about 2 to about 400 nanometers, and in some embodiments, from about 5 to about 300 nanometers. It should be also understood that the nano-scale domains may also be formed from a combination of the microinclusion and nanoinclusion additives and/or other components of the composition. The nanoinclusion additive is typically employed in an amount of from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from any linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics, polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene). Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via a hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

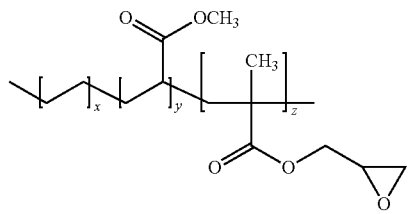

wherein, x, y, and z are 1 or greater.

The epoxy functional monomer may be formed into a polymer using a variety of known techniques. For example, a monomer containing polar functional groups may be grafted onto a polymer backbone to form a graft copolymer.

Such grafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the matrix polymer employed in the composition. The polyepoxide may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers, cyanide-functionalized polymers, etc. When employed, such reactive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthethic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquaternary ammonium compounds that are capable of exchanging cations with the clay, such as dimethyl bis[hydrogenated tallow] ammonium chloride (2M2HT), methyl benzyl bis[hydrogenated tallow] ammonium chloride (MB2HT), methyl tris[hydrogenated tallow alkyl] chloride (M3HT), etc. Examples of commercially available organic nanoclays may include, for instance, Dellite® 43B (Laviosa Chimica of Livorno, Italy), which is a montmorillonite clay modified with dimethyl benzylhydrogenated tallow ammonium salt. Other examples include Cloisite® 25A and Cloisite® 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanonclusion additives in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

D. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the matrix polymer. For example, the melt flow rate of the composition (on a dry basis) may be from about 0.1 to about 40 grams per 10 minutes, in some embodiments from about 0.2 to about 20 grams per 10 minutes, and in some embodiments, from about 0.3 to about 15 grams per 10 minutes, determined at a load of 2160 grams and at 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and plasticizers (e.g., solid or semi-solid polyethylene glycol). In fact, the thermoplastic composition may be generally free of blowing agents and/or plasticizers. For example, blowing agents and/or plasticizers may be present in an amount of no more than about 1 wt. %, in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition.

II. Blending

To form the thermoplastic composition, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

Regardless of the particular processing technique chosen, the resulting melt blended composition typically contains nano-scale domains of the nanoinclusion additive and optionally micro-scale domains of the microinclusion additive. The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 300° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate may be equal to $4Q/R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficiently high to disperse the nanoinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

III. Sheet Formation

Any known technique may be used to form a sheet from the composition, including blowing, casting, flat die extruding, etc. In one particular embodiment, the sheet may be formed by a blown process in which a gas (e.g., air) is used to expand a bubble of the extruded polymer blend through an annular die. The bubble is then collapsed and collected in flat form. Blowing processes are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al. In yet another embodiment, however, the sheet is formed using a casting technique.

Referring to FIG. 1, for instance, one embodiment of a method for forming a cast sheet is shown. In this embodiment, the raw materials (not shown) are supplied to the extruder 80 from a hopper 40 and then cast onto a casting roll 90 to form a single-layered precursor sheet 10a. If a multilayered sheet is to be produced, the multiple layers are co-extruded together onto the casting roll 90. The casting roll 90 may optionally be provided with embossing elements to impart a pattern to the sheet. Typically, the casting roll 90 is kept at temperature sufficient to solidify and quench the sheet 10a as it is formed, such as from about 20 to 60° C. If desired, a vacuum box may be positioned adjacent to the casting roll 90 to help keep the precursor sheet 10a close to the surface of the roll 90. Additionally, air knives or electrostatic pinners may help force the precursor sheet 10a against the surface of the casting roll 90 as it moves around a spinning roll. An air knife is a device known in the art that focuses a stream of air at a very high flow rate to pin the edges of the sheet.

Once cast, the sheet 10a may then be optionally oriented in one or more directions to further improve sheet uniformity. The sheet may be immediately reheated to a temperature below the melting point of one or more polymers in the sheet, but high enough to enable the composition to be drawn or stretched. In the case of sequential orientation, the "softened" sheet is drawn by rolls rotating at different speeds of rotation such that the sheet is stretched to the desired draw ratio in the longitudinal direction (machine direction). This "uniaxially" oriented sheet may then be optionally laminated to a fibrous web. In addition, the uniaxially oriented sheet may also be oriented in the cross-machine direction to form a "biaxially oriented" sheet. For example, the sheet may be clamped at its lateral edges by chain clips and conveyed into a tenter oven. In the tenter oven, the sheet may be reheated and drawn in the cross-machine direction to the desired draw ratio by chain clips diverged in their forward travel.

Referring again to FIG. 1, for instance, one method for forming a uniaxially oriented sheet is shown. As illustrated, the precursor sheet 10a is directed to an orientation unit 100 or machine direction orienter ("MDO"), such as commercially available from Marshall and Willams, Co. of Providence, R.I. The MDO has a plurality of stretching rolls (such as from 5 to 8) which progressively stretch and thin the sheet in the machine direction, which is the direction of travel of the sheet through the process as shown in FIG. 1. While the MDO 100 is illustrated with eight rolls, it should be understood that the number of rolls may be higher or lower, depending on the level of stretch that is desired and the degrees of stretching between each roll. The sheet may be stretched in either single or multiple discrete stretching operations. It should be noted that some of the rolls in an MDO apparatus may not be operating at progressively higher speeds. If desired, some of the rolls of the MDO 100 may act as preheat rolls. If present, these first few rolls heat the sheet 10a above room temperature (e.g., to 125° F.). The progressively faster speeds of adjacent rolls in the MDO act to stretch the sheet 10a. The rate at which the stretch rolls rotate determines the amount of stretch in the sheet and final weight.

The resulting sheet 10b may then be wound and stored on a take-up roll 60. While not shown here, various additional potential processing and/or finishing steps known in the art, such as slitting, treating, aperturing, printing graphics, or lamination of the sheet with other layers (e.g., films, nonwoven web materials, etc.), may be performed without departing from the spirit and scope of the invention.

The polymeric sheet of the present invention may be mono- or multi-layered (e.g., from 2 to 20 layers, and in some embodiments, from 3 to 10 layers). For example, a multi-layered sheet may contain at least one core layer that is positioned adjacent to at least one outer layer. Outer layers are often used for heat sealing or printing. In one embodiment, for example, it may be desirable to employ first and second outer layers that sandwich the core layer. The core layer(s) typically constitute a substantial portion of the weight of the sheet, such as from about 50 wt. % to about 99 wt. %, in some embodiments from about 55 wt. % to about 90 wt. %, and in some embodiments, from about 60 wt. % to about 85 wt. % of the sheet. The outer layer(s) may likewise constitute from about 1 wt. % to about 50 wt. %, in some embodiments from about 10 wt. % to about 45 wt. %, and in some embodiments from about 15 wt. % to about 40 wt. % of the sheet.

The thermoplastic composition of the present invention may be employed in any layer of the sheet, including the core layer and/or the outer layer. In one embodiment, for example, the core layer is formed from the composition of the present invention and the outer layer(s) are formed from the composition or from an additional polymer material. Likewise, in other possible embodiments, one or more of the outer layers are formed from the composition of the present invention and the core layer is formed from an additional polymer material. When employed, the additional material may include any type of polymer, such as polyolefins (e.g., polyethylene, polypropylene, etc.), polyesters, polyamides, styrenic copolymers, polyurethanes, polyvinyl acetate, polyvinyl alcohol, etc.

Regardless of the particular manner in which it is formed, the sheet may be drawn to form the desired porous network. If desired, the sheet may be drawn in-line as it is being formed. Alternatively, the sheet may be drawn in its solid state after being formed, before and/or after it is thermoformed into the desired shape. By "solid state" drawing, it is generally meant that the composition is kept at a temperature below the melting temperature of the matrix polymer. Among other things, this helps to ensure that the polymer chains are not altered to such an extent that the porous network becomes unstable. For example, the sheet may be drawn at a temperature of from about 0° C. to about 50° C., in some embodiments from about 15° C. to about 40° C., and in some embodiments, from about 20° C. to about 30° C. This may optionally be at least about 10° C., in some embodiments at least about 20° C., and in some embodiments, at least about 30° C. below the glass transition temperature of the component having the highest glass transition temperature (e.g., matrix polymer). In certain embodiments, for example, drawing may occur at a temperature of from about −50° C. to about 150° C., in some embodiments from about −40° C. to about 100° C., and in some embodiments, from about −20° C. to about 50° C.

Drawing may occur in one or multiple stages and using any of a variety of different techniques. In one embodiment, for example, the sheet may be drawn prior to being thermoformed with a machine direction orienter ("MDO"), such as using the unit 100 shown in FIG. 1. To draw the sheet in the manner described above, it is typically desired that the rolls of the MDO are not heated. Nevertheless, if desired, one or more rolls may be heated to a slight extent to facilitate the drawing process so long as the temperature of the composition remains below the ranges noted above. The sheet is typically drawn (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn sheet by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation. Although the sheet is typically drawn without the application of external heat (e.g., heated rolls), such heat might be optionally employed to improve processability, reduce draw force, increase draw rates, and improve uniformity.

Drawing in the manner described above can result in the formation of pores that have a "nano-scale" dimension ("nanopores"), such as described above. Micropores may also be formed at and around the micro-scale domains during drawing that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1.1 to about 15, and in some embodiments, from about 1.2 to about 5. The "axial dimension" is the dimension in the direction of the major axis (e.g., length), which is typically in the direction of drawing.

The present inventors have also discovered that the pores (e.g., micropores, nanopores, or both) can be distributed in a substantially homogeneous fashion throughout the composition. For example, the pores may be distributed in columns that are oriented in a direction generally perpendicular to the direction in which a stress is applied. These columns may be generally parallel to each other across the width of the composition. Without intending to be limited by theory, it is believed that the presence of such a homogeneously distributed porous network can result in good mechanical properties (e.g., energy dissipation under load and impact strength). This is in stark contrast to conventional techniques for creating pores that involve the use of blowing agents, which tend to result in an uncontrolled pore distribution and poor mechanical properties. Notably, the formation of the porous network by the process described above does not necessarily result in a substantial change in the cross-sectional size (e.g., width) or thickness of the material. In other words, the material is not substantially necked, which may allow it to retain a greater degree of strength properties. For example, the width may be reduced by an amount no more than about 20%, and in some embodiments, no more than about 15%. Likewise, the thickness may be reduced by an amount no more than about 10%, and in some embodiments, no more than about 5%.

In addition to forming a porous network, drawing can also significantly increase the axial dimension of the micro-scale domains so that they have a generally linear, elongated shape. For example, the elongated micro-scale domains may have an average axial dimension that is about 10% or more, in some embodiments from about 20% to about 500%, and in some embodiments, from about 50% to about 250% greater than the axial dimension of the domains prior to drawing. The axial dimension after drawing may, for instance, range from about 0.5 to about 250 micrometers, in some embodiments from about 1 to about 100 micrometers, in some embodiments from about 2 to about 50 micrometers, and in some embodiments, from about 5 to about 25 micrometers. The micro-scale domains may also be relatively thin and thus have a small cross-sectional dimension. For instance, the cross-sectional dimension may be from about 0.05 to about 50 micrometers, in some embodiments from about 0.2 to about 10 micrometers, and in some embodiments, from 0.5 to about 5 micrometers. This may result in an aspect ratio for the micro-scale domains (the ratio of the axial dimension to the cross-sectional dimension) of from about 2 to about 150, in some embodiments from about 3 to about 100, and in some embodiments, from about 4 to about 50.

As a result of the porous and elongated domain structure, the present inventors have discovered that the resulting composition can expand uniformly in volume when drawn in longitudinal direction, which is reflected by a low "Poisson coefficient", as determined according to the following equation:

$$\text{Poisson coefficient} = -E_{transverse}/E_{longitudinal}$$

where $E_{transverse}$ is the transverse deformation of the material and $E_{longitudinal}$ is the longitudinal deformation of the material. More particularly, the Poisson coefficient of the material can be approximately 0 or even negative. For example, the Poisson coefficient may be about 0.1 or less, in some embodiments about 0.08 or less, and in some embodiments, from about −0.1 to about 0.04. When the Poisson coefficient is zero, there is no contraction in transverse direction when the material is expanded in the longitudinal direction. When the Poisson coefficient is negative, the transverse or lateral dimensions of the material are also expanding when the material is drawn in the longitudinal direction. Materials having a negative Poisson coefficient can thus exhibit an increase in width when drawn in the longitudinal direction, which can result in increased energy absorption in the cross direction.

In addition to having a porous structure, which results in a reduced density and polymer content, the polymeric sheet is also able to retain good mechanical properties during use. For example, the sheet may be relatively ductile. One parameter that is indicative of the ductility of the sheet is the percent elongation of the sheet at its break point, as determined by the stress strain curve, such as obtained in accordance with ASTM Standard D638-10 at 23° C. For example, the percent elongation at break of the sheet in the machine direction ("MD") may be about 10% or more, in some embodiments about 50% or more, in some embodiments about 80% or more, and in some embodiments, from about 100% to about 600%. Likewise, the percent elongation at break of the sheet in the cross-machine direction ("CD") may be about 15% or more, in some embodiments about 40% or more, in some embodiments about 70% or more, and in some embodiments, from about 100% to about 400%. Another parameter that is indicative of ductility is the tensile modulus of the sheet, which is equal to the ratio of the tensile stress to the tensile strain and is determined from the slope of a stress-strain curve. For example, the sheet typically exhibits a MD and/or CD tensile modulus of about 2500 Megapascals ("MPa") or less, in some embodiments about 2200 MPa or less, in some embodiments from about 50 MPa to about 2000 MPa, and in some embodiments, from about 100 MPa to about 1000 MPa. The tensile modulus may be determined in accordance with ASTM D638-10 at 23° C.

Although the sheet is ductile, it can still be relatively strong. One parameter that is indicative of the relative strength of the sheet is the ultimate tensile strength, which is equal to the peak stress obtained in a stress-strain curve, such as obtained in accordance with ASTM Standard D638-10. For example, the sheet may exhibit an MD and/or CD peak stress of from about 5 to about 65 MPa, in some embodiments from about 10 MPa to about 60 MPa, and in some embodiments, from about 20 MPa to about 55 MPa. The sheet may also exhibit an MD and/or CD break stress of from about 5 MPa to about 60 MPa, in some embodiments from about 10 MPa to about 50 MPa, and in some embodiments, from about 20 MPa to about 45 MPa. The peak stress and break stress may be determined in accordance with ASTM D638-10 at 23° C.

If desired, the polymeric sheet of the present invention may be subjected to one or more additional processing steps, before and/or after being drawn. Examples of such processes include, for instance, groove roll drawing, embossing, coating, etc. In certain embodiments, the sheet may also be annealed to help ensure that it retains the desired shape. Annealing typically occurs at or above the glass transition temperature of the polymer matrix, such as at from about 40° to about 120° C., in some embodiments from about 50° C. to about 100° C., and in some embodiments, from about 70° C. to about 90° C. The polymeric sheet may also be surface treated using any of a variety of known techniques to improve its properties. For example, high energy beams (e.g., plasma, x-rays, e-beam, etc.) may be used to remove or reduce any skin layers, to change the surface polarity, porosity, topography, to embrittle a surface layer, etc. If desired, such surface treatment may be used before and/or drawing of the thermoplastic composition.

IV. Thermoformed Article

Regardless of its particular form, the polymeric sheet may be thermoformed into a wide variety of different three-dimensional articles. Thermoforming generally involves heating the polymeric sheet to a certain temperature, shaping the sheet within a mold, and then optionally trimming the shaped article to create the desired article. The particular forming technique is not critical, and any of a variety of conventional processes may be employed in the present invention. Suitable techniques may include, for instance, vacuum forming, plug assist forming, drape forming, press forming, etc. For example, the sheet may be fed to a heating device (e.g., convection oven, resistance heater, infrared heater, etc.) that heats it to a temperature sufficient to cause the polymer to deform or stretch. This temperature is generally above the glass transition temperature of the composition, yet at or below the melting temperature. For example, the thermoforming temperature may be about 30° C. or more below, in some embodiments about 40° C. or more, and in some embodiments, from about 45° C. to about 80° C. below the melting temperature of the composition. In certain embodiments, for example, the sheet may be heated to a temperature of from about 30° C. to about 150° C., in some embodiments from about 50° C. to about 130° C., and in some embodiments, from about 60° C. to about 120° C. Once heated, the polymeric sheet may then be fed to a mold where a force (e.g., suctional force) is placed against the sheet to cause it to conform to the contours of the mold. The mold cavity imparts the shape of the article to the polymeric sheet and can also cool the material to a temperature significantly below the melting point so that it solidifies adequately to retain its shape upon removal from the mold.

Various types of articles may be thermoformed in accordance with the present invention. The resulting article may, for example, be a product for the food, medical, or general retail industries, such as a package, cup, tub, pail, jar, box, container, lid, tray (e.g., for a food article), blister, clamshell, bottle, pouch, appliance part (e.g., refrigerator liner), pallet, etc.; automotive or aircraft part, such as a dash panel, door panel, utility vehicle bed, etc.; and so forth.

The present invention may be better understood with reference to the following examples.

Test Methods

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Tensile Properties:

Sheets may be tested for tensile properties (peak stress, modulus, strain at break, and energy per volume at break) on a MTS Synergie 200 tensile frame. The test may be performed in accordance with ASTM D638-10 (at about 23° C.). Samples may be cut into dog bone shapes with a center width of 3.0 mm before testing. The dog-bone samples may be held in place using grips on the MTS Synergie 200 device with a gauge length of 18.0 mm. The samples may be stretched at a crosshead speed of 5.0 in/min until breakage occurred. Five samples may be tested for each sheet in both the machine direction (MD) and the cross direction (CD). A computer program (e.g., TestWorks 4) may be used to collect data during testing and to generate a stress versus strain curve from which a number of properties may be determined, including modulus, peak stress, elongation, and energy to break.

Expansion Ratio, Density, and Percent Pore Volume:

To determine expansion ratio, density, and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated by $W_i \times T_i \times L_i = V_i$. The volume ($V_f$) after drawing may also be calculated by $W_f \times T_f \times L_f = V_f$. The expansion ratio ($\phi$) may be calculated by $\phi = V_f/V_i$; the density ($P_f$) of was calculated by: $P_f = P_i/\phi$, where $P_i$ is density of precursor material; and the percent pore volume (% $V_v$) may be calculated by: % $V_v = (1 - 1/\phi) \times 100$.

Moisture Content:

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Example 1

The ability to form a polymeric sheet for use in a thermoformed article was demonstrated. Initially, a blend of 85.3 wt. % polylactic acid (PLA 6201 D, Natureworks®), 9.5 wt. % of a microinclusion additive, 1.4 wt. % of a nanoinclusion additive, and 3.8 wt. % of an interfacial modifier was demonstrated. The microinclusion additive was Vistamaxx™ 2120 (ExxonMobil), which is a polyolefin copolymer/elastomer with a melt flow rate of 29 g/10 min (190° C., 2160 g) and a density of 0.866 g/cm³. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %, the internal interfacial modifier was PLURIOL® WI 285 Lubricant from BASF, which is a polyalkylene glycol functional fluid. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a sheet thickness ranging from 0.54 to 0.58 mm.

Example 2

The sheet produced in Example 1 was cut to a 6" length and then drawn to 100% elongation using a MTS 820 hydraulic tensile frame in tensile mode at 50 mm/min.

Example 3

The sheet produced in Example 1 was cut to a 6" length and then drawn to 150% elongation using a MTS 820 hydraulic tensile frame in tensile mode at 50 mm/min.

Example 4

The sheet produced in Example 1 was cut to a 6" length and then drawn to 200% elongation using a MTS 820 hydraulic tensile frame in tensile mode at 50 mm/min.

Example 5

Pellets were formed as described in Example 1 and then flood fed into a Rheomix 252 single screw extruder with a L/D ratio of 25:1 and heated to a temperature of 212° C. where the molten blend exited through a Haake 6 inch width cast die and drawn in the machine direction to a longitudinal deformation of 160% at a pull rate of 50 mm/min (deformation rate of 67%/min) via MTS Synergie 200 tensile frame with grips at a gage length of 75 mm.

Example 6

Sheets were formed as described in Example 5, except that the sheet was also stretched in the cross-machine direction to a deformation of 100% at a pull rate of 50 mm/min (deformation rate of 100%/min) with grips at a gage length of 50 mm. Various properties of the sheets of Examples 5-6 were tested as described above. The results are set forth below in Tables 1-2.

TABLE 1

Sheet Properties

| Ex. | Average Thickness (μm) | Expansion Ratio (φ) | Percent Void Volume (% $V_v$) | Density (g/cm³) |
|---|---|---|---|---|
| 5 | 41.4 | 1.82 | 45 | 0.65 |
| 6 | 34.0 | 2.13 | 53 | 0.56 |

TABLE 2

Tensile Properties

| Example | | Avg. Thickness (μm) | Avg. Modulus (MPa) | Avg. Yield Stress (MPa) | Avg. Break Stress (MPa) | Avg. Strain at Break (%) | Avg. Energy per Volume at Break (J/cm³) |
|---|---|---|---|---|---|---|---|
| 5 | MD | 44.5 | 466 | 41.4 | 36.9 | 54.6 | 16.8 |
|   | CD | 40.4 | 501 | 15.9 | 15.9 | 62.6 | 9.4 |
| 6 | MD | 37.3 | 265 | 26.7 | 26.3 | 85.5 | 15.8 |
|   | CD | 34.3 | 386 | 25.1 | 25.2 | 45.8 | 9.3 |

Example 7

Figure 2:
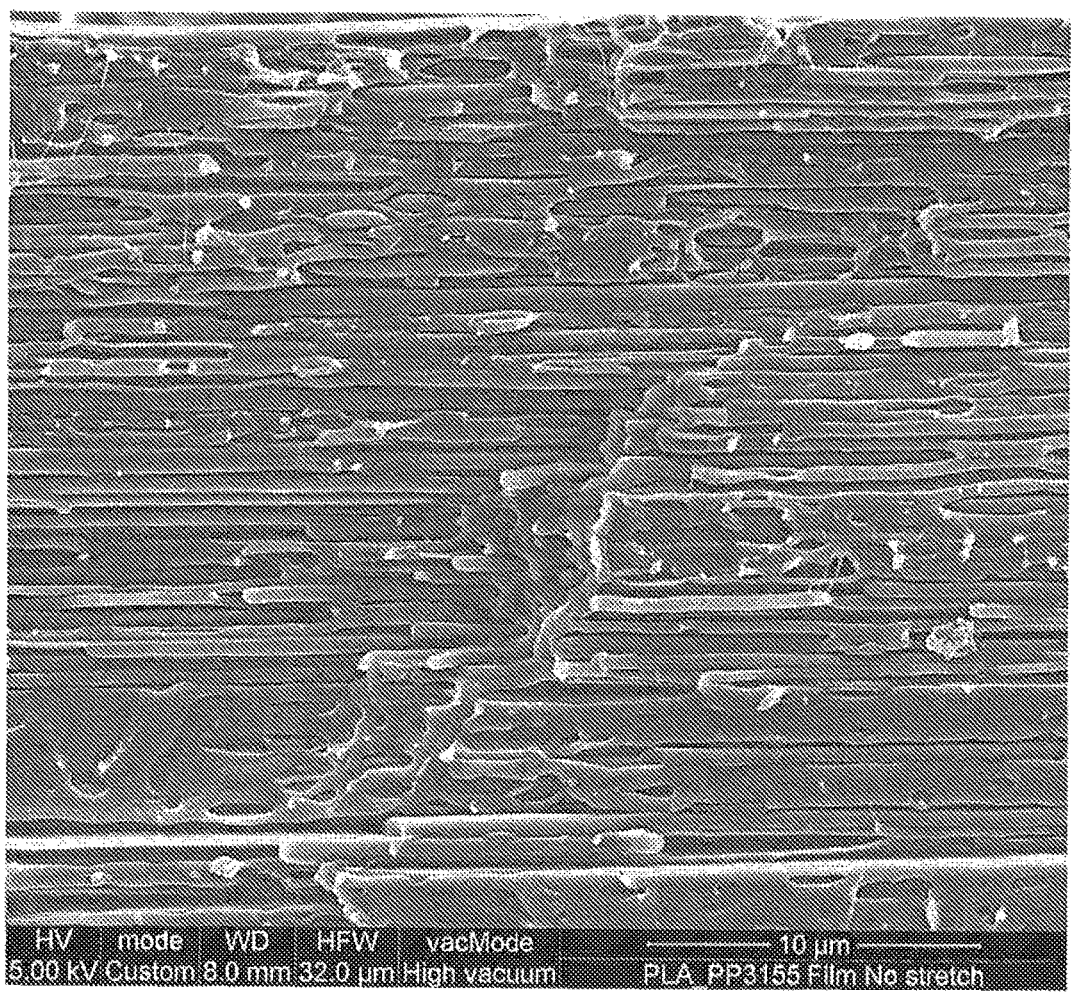
FIGS. 2-3 are SEM microphotographs of the unstretched sheet of Example 7 (sheet was cut parallel to machine direction orientation)
Figure 3:
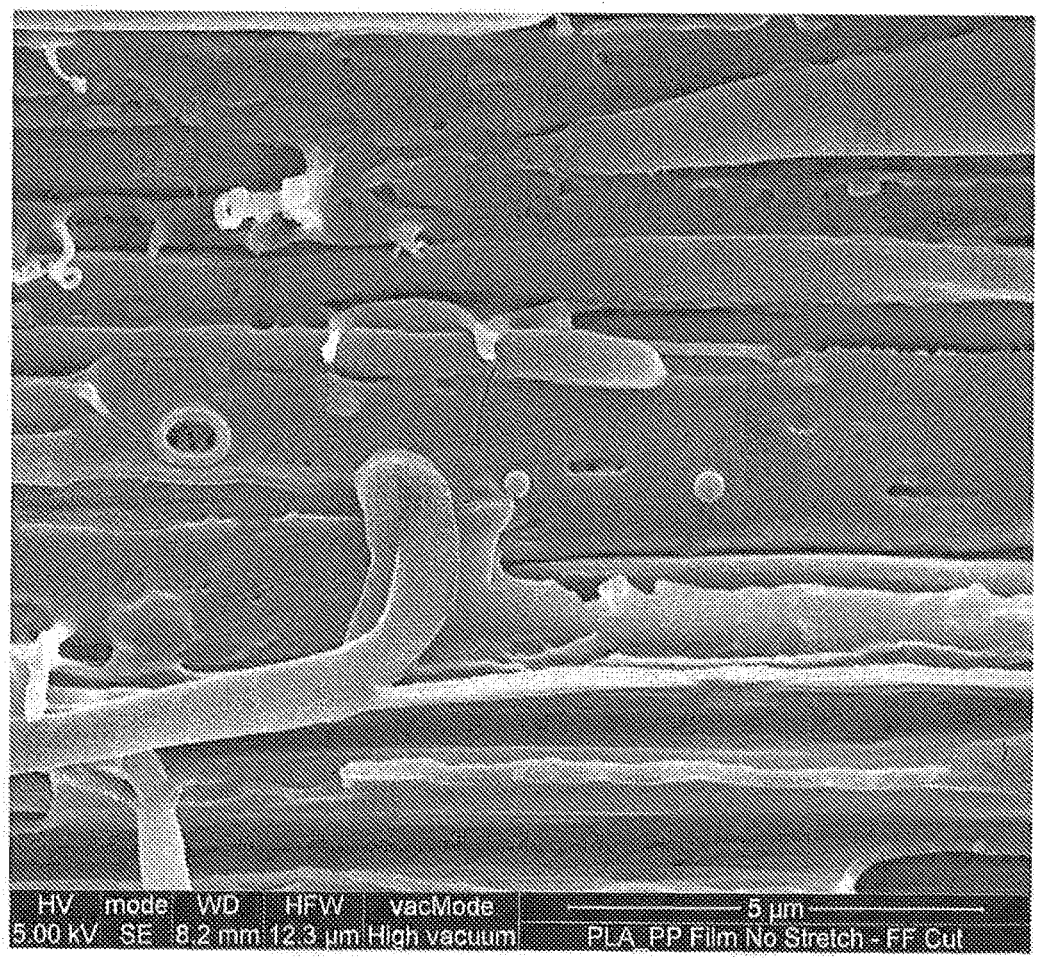
Figure 4:
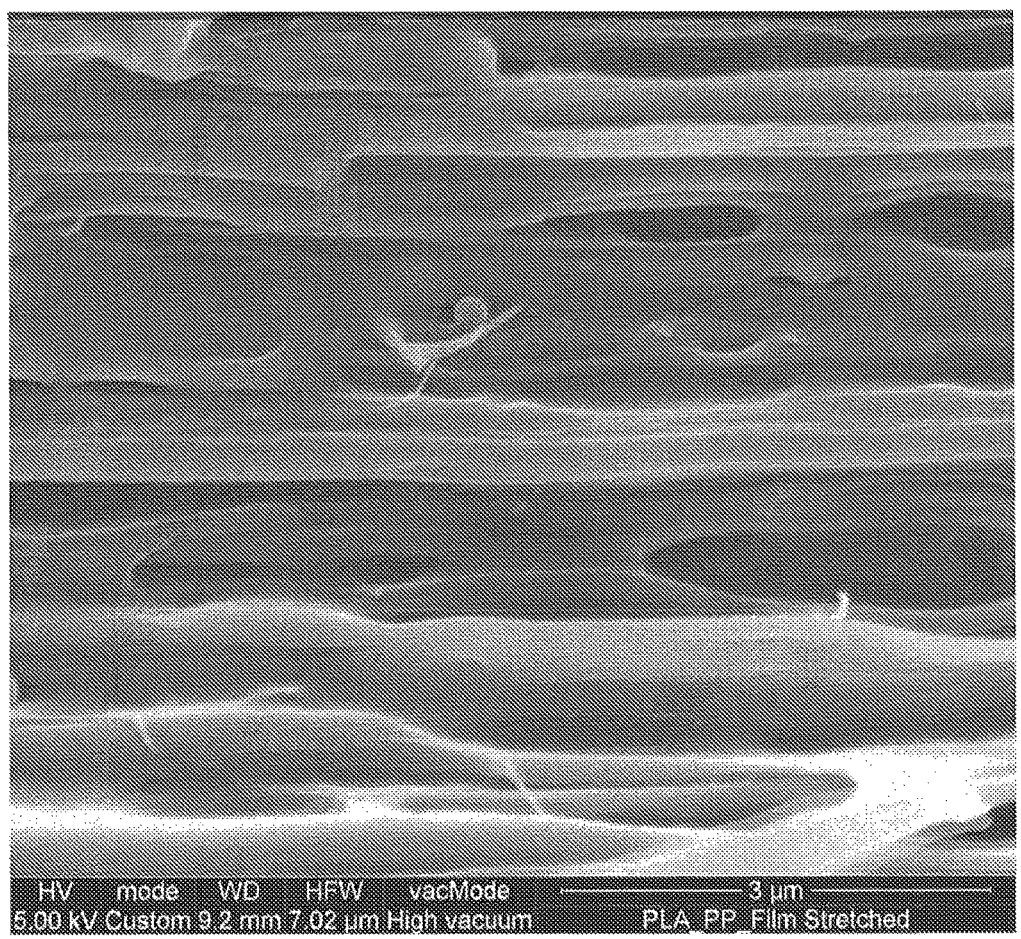
FIGS. 4-5 are SEM microphotographs of the stretched sheet of Example 7 (sheet was cut parallel to machine direction orientation)
Figure 5:
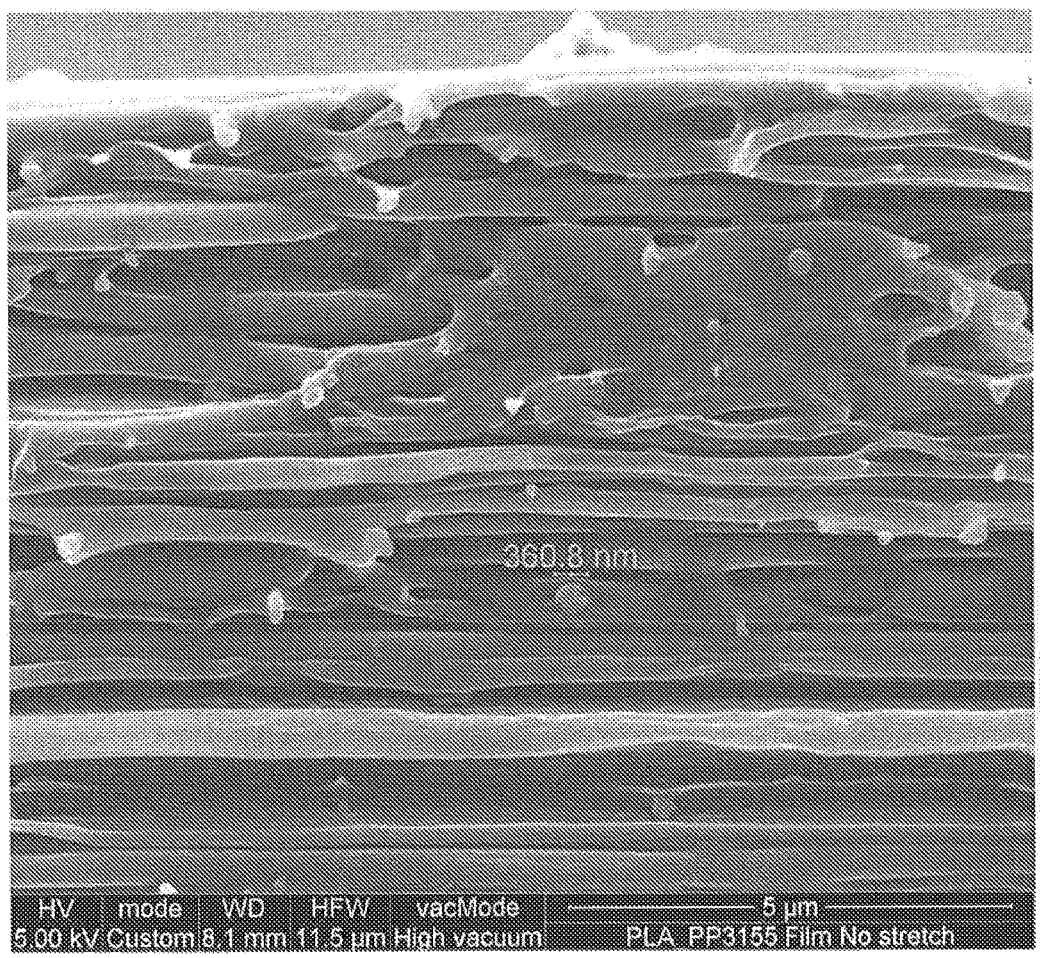

Pellets were formed as described in Example 1 and then flood fed into a signal screw extruder heated to a temperature of 212° C., where the molten blend exited through 4.5 inch width slit die and drawn in the machine direction to about 100% to initiate cavitation and void formation. The morphology was analyzed by scanning electron microscopy (SEM) before and after stretching. The results are shown in FIGS. 2-5. As shown in FIGS. 2-3, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 4-5 show the sheet after stretching. As indicated, pores formed around the microinclusion and nanoinclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

Example 8

Figure 6:
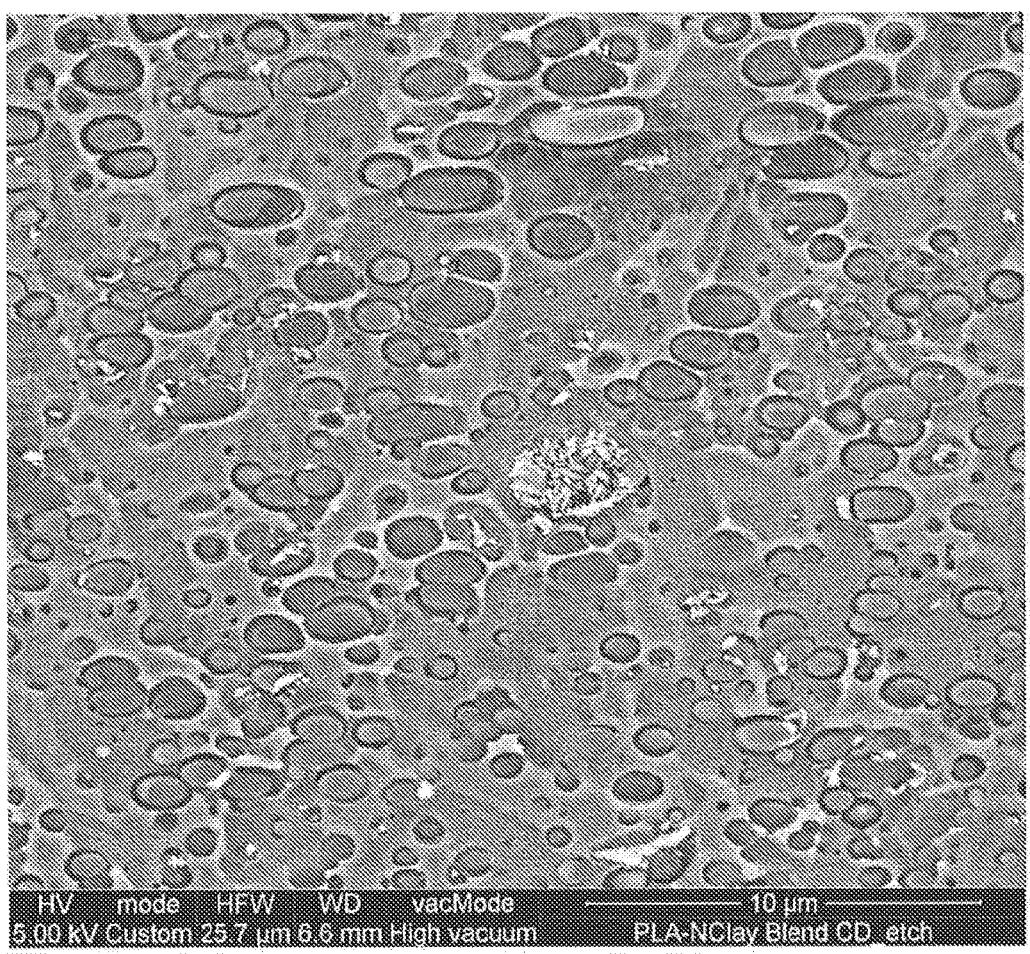
FIGS. 6-7 are SEM microphotographs of the unstretched sheet of Example 8, where the sheet was cut perpendicular to the machine direction in FIG. 6 and parallel to the machine direction in FIG. 7.
Figure 7:
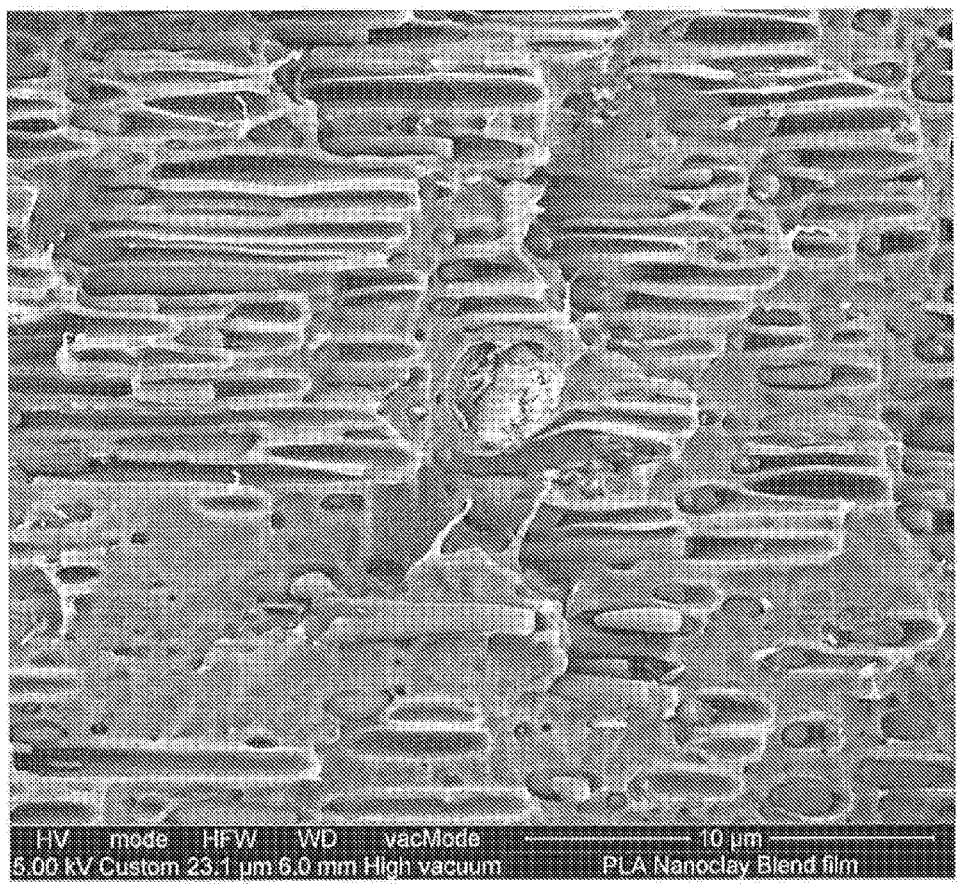
Figure 8:
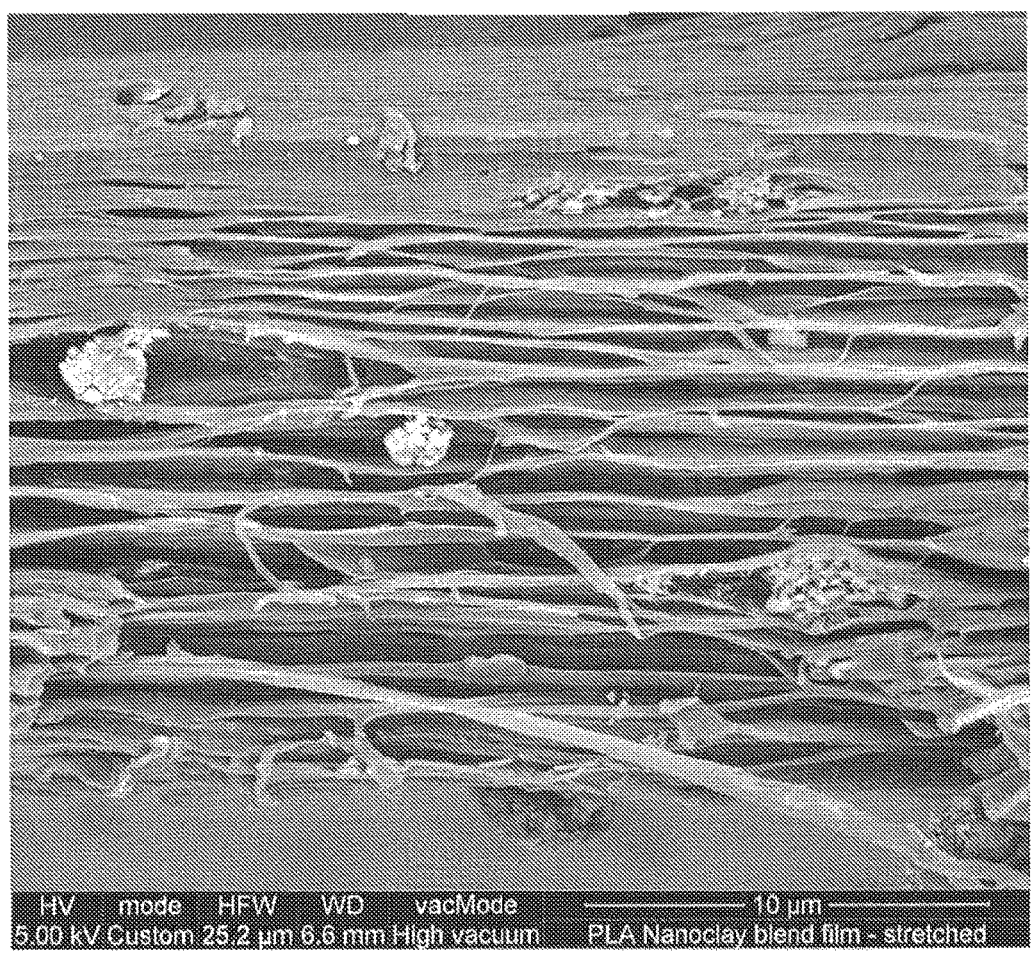
FIGS. 8-9 are SEM microphotographs of the stretched sheet of Example 8 (sheet was cut parallel to machine direction orientation).
Figure 9:
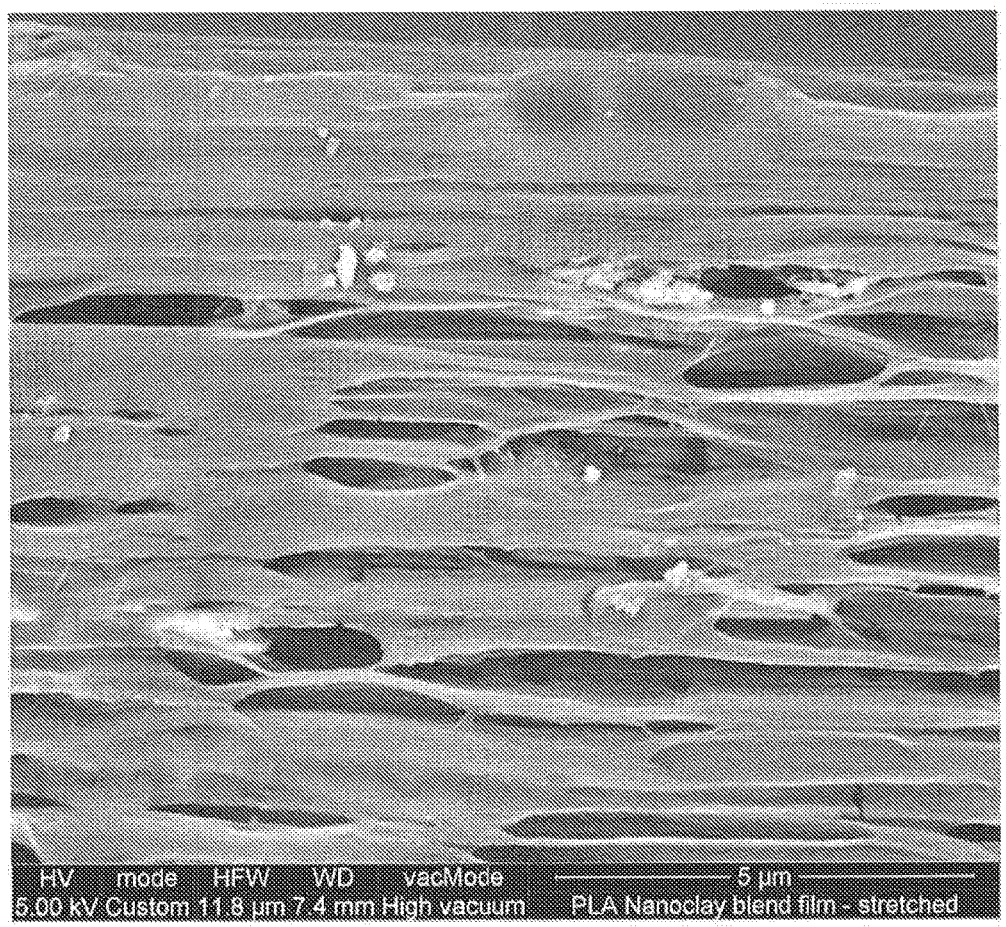

The compounded pellets of Example 7 were dry blended with another nanoinclusion additive, which was a halloisite clay masterbatch (MacroComp MNH-731-36, MacroM) containing 22 wt. % of a styrenic copolymer modified nanoclay and 78 wt. % polypropylene (Exxon Mobil 3155). The mixing ratio was 90 wt. % of the pellets and 10 wt. % of the clay masterbatch, which provided a total clay content of 2.2%. The dry blend was then flood fed into a signal screw extruder heated to a temperature of 212° C., where the molten blend exited through 4.5 inch width slit die and drawn in the machine direction to about 100% to initiate cavitation and void formation. The morphology was analyzed by scanning electron microscopy (SEM) before and after stretching. The results are shown in FIGS. 6-9. As shown in FIGS. 6-7, some of the nanoclay particles (visible as brighter regions) became dispersed in the form of very small domains—i.e., axial dimension ranging from about 50 to about 300 nanometers. The masterbatch itself also formed domains of a micro-scale size (axial dimension of from about 1 to about 5 micrometers). Also, the microinclusion additive (Vistamaxx™) formed elongated domains, while the nanoinclusion additives (Lotader®, visible as ultrafine dark dots and nanoclay masterbatch, visible as bright platelets) formed spheroidal domains. The stretched sheet is shown in FIGS. 8-9. As shown, the voided structure is more open and demonstrates a broad variety of pore sizes. In addition to highly elongated micropores formed by the microinclusions (Vistamaxx™), the nanoclay masterbatch inclusions formed more open spheroidal micropores with an axial size of about 10 microns or less and a transverse size of about 2 microns. Spherical nanopores are also formed by the nanoinclusion additives (Lotader®) and nanoclay particles). Various tensile properties (machine direction) of the sheets of Example 7 and 8 were also tested. The results are provided below.

| Example | Avg. Thickness (μm) | Avg. Modulus (MPa) | Avg. Yield Stress (MPa) | Avg. Break Stress (MPa) | Avg. Strain at Break (%) | Avg. Energy per Vol. (J/cm³) |
|---|---|---|---|---|---|---|
| 7 | 49 | 2066 | 48.1 | 35 | 236 | 73 |
| 8 | 56 | 1945 | 41.3 | 36 | 299 | 85 |

As shown, the addition of the nanoclay filler resulted in a slight increase in break stress and a significant increase in elongation at break.

Example 9

The ability to form a polymeric sheet for use in a thermoformed article was demonstrated. Initially, a blend of 85.3 wt. % polylactic acid (PLA 6201 D, Natureworks®), 9.5 wt. % of a microinclusion additive, 1.4 wt. % of a nanoinclusion additive, and 3.8 wt. % of an interfacial modifier was demonstrated. The microinclusion additive was Vistamaxx™ 2120 (ExxonMobil). The nanoinclusion additive was poly(ethylene-co-methyl acrylate-co-glycidyl methacrylate) (Lotader® AX8900, Arkema) and the internal interfacial modifier was PLURIOL® WI 285. The polymers were fed into a co-rotating, twin-screw extruder. The extruder possessed 10 zones, numbered consecutively 1-10 from the feed hopper to the die. The first barrel zone #1 received the resins via gravimetric feeder at a total throughput of 500 pounds per hour. The PLURIOL® WI285 was added via injector pump into barrel zone #4. The extrusion temperature started at 50° C. in zone 1 and was increased to 220° C. in zones 2-8. Zone 9 and 10 were set to temperature of 265° C. to facilitate the pelletization. The die used to extrude the resin had 24 die openings The extruded resin was cut into pellets using an underwater pelletizing system running at 4250 revolutions per minute (Gala Industries, Eagle Rock, Va.) The extruder screw speed was 360 revolutions per minute ("rpm"). The pellets were then flood fed into a 3.5 inch signal screw extruder heated to a temperature of 205° C. where the molten blend exited through 91.5 cm width slit die and drawn to a sheet thickness of 0.38 mm.

Example 10

A sheet was formed as described in Example 9 and then uniaxially drawn using a Machine Direction Orientation Line (Windmoller & Holscher, Lengerich, Germany). The sheet was drawn at a ratio of 1.56× (based on the winder speed divided by in the MDO infeed roll speed). Draw was applied in two zones at a temperature of 43° C.

Example 11

The sheets of Example 9 and 10 were then thermoformed into various molds using a Formech 450 vacuum molding unit. Heater output and dwell time were controlled directly on the Formech Unit and Sheet temperature and measured using a hand held non-contact infrared thermometer. The thermoforming conditions are provided in the table below.

| Sheet | Heater output (%) | Dwell Time (sec) | Sheet Temperature ° C. |
|---|---|---|---|
| EXAMPLE 10 | 66 | 15 | 160 |
| EXAMPLE 10 | 66 | 15 | 177 |
| EXAMPLE 10 | 66 | 15 | 186 |

| Sheet | Heater output (%) | Dwell Time (sec) | Sheet Temperature ° C. |
|---|---|---|---|
| EXAMPLE 10 | 66 | 15 | 199 |
| EXAMPLE 10 | 66 | 20 | 236 |
| EXAMPLE 10 | 83 | 15 | 270 |
| EXAMPLE 10 | 50 | 15 | 188 |
| EXAMPLE 10 | 50 | 10 | 156 |
| EXAMPLE 10 | 50 | 15 | 156 |
| EXAMPLE 10 | 50 | 18 | 156 |
| EXAMPLE 10 | 58 | 15 | 156 |
| EXAMPLE 10 | 58 | 15 | 160 |
| EXAMPLE 9 | 66 | 15 | 170 |
| EXAMPLE 9 | 66 | 15 | 170 |
| EXAMPLE 9 | 66 | 20 | 190 |
| EXAMPLE 9 | 66 | 25 | 220 |
| EXAMPLE 9 | 58 | 15 | 170 |
| EXAMPLE 9 | 58 | 15 | 170 |
| EXAMPLE 10 | 58 | 15 | 163 |
| EXAMPLE 9 | 58 | 15 | 163 |
| EXAMPLE 9 | 66 | 15 | 178 |
| EXAMPLE 9 | 66 | 20 | 198 |

Example 12

A blend of materials that contained 91.75 wt. % polypropylene (Total Petrochemicals 3762), 7.5 wt. % polylactic acid (Natureworks Ingeo 6251D), and 0.75 wt. % of a polyepoxide modifier (Arkema Lotader AX8900). This mixture was melt blended via a twin screw extruder at 220° C. to form a homogeneous polymer blend. The molten polymer blend was then extruded through a multi-filament die, quenched via water, and cut in to a pellet via underwater pelletizing system, such as those available from Gala Industries of Eagle Rock, Va. The compounded pellet was then flood fed into a HAAKE Rheomex single screw extruder (Thermo Scientific, 24:1 length to diameter ratio) with a cast film die. Pellets were melted in the extruder at a temperature of 200° C. and extruded through a 8-inch wide film die onto a casting roll at a temperature of 25° C. A draw force was applied to the molten film to reduce the thickness to approximately 0.18 to 0.2 mm.

Example 13

The sheet material from Example 12 was stretched at room temperature using a MTS 810 tensile frame at a rate of 50 millimeters per minute. Samples were stretched to 200% elongation. At this level, the material necked and reduced in thickness to 0.076 mm, resulting in a reduction in width of 20%.

The sheets of Example 12 and 13 were then thermoformed into various molds using a Formech 450 vacuum molding unit. Heater output and dwell time were controlled directly on the Formech Unit and Sheet temperature and measured using a hand held non-contact infrared thermometer. The thermoforming conditions are provided in the table below.

| Sheet | Heater output (%) | Dwell Time (sec) | Sheet Temperature ° F. |
|---|---|---|---|
| EXAMPLE 12 | 66 | 6 | 109 |
| EXAMPLE 12 | 66 | 15 | 150 |
| EXAMPLE 12 | 83 | 15 | 193 |
| EXAMPLE 12 | 83 | 25 | — |
| EXAMPLE 12 | 83 | 25 | 245 |
| EXAMPLE 12 | 100 | 25 | 265 |
| EXAMPLE 12 | 83 | 30 | 265 |
| EXAMPLE 12 | 83 | 27 | 280 |
| EXAMPLE 12 | 83 | 25 | 265 |
| EXAMPLE 12 | 83 | 25 | 265 |
| EXAMPLE 13 | 83 | 15 | Melted |
| EXAMPLE 13 | 66 | 5 | 189 |
| EXAMPLE 13 | 66 | 7 | 189 |
| EXAMPLE 13 | 66 | 10 | 192 |
| EXAMPLE 13 | 66 | 15 | 199 |
| EXAMPLE 13 | 66 | 20 | 190 |
| EXAMPLE 13 | 66 | 30 | 190 |

Example 14

A sheet was formed as described in Example 12, except that a lower melt draw force was used to create a film with a thickness of 0.25 to 0.28 mm.

Example 15

The sheet of Example 14 was stretched at room temperature using a MTS 810 tensile frame at a rate of 50 millimeters per minute. Samples were stretched to 200% elongation. At this level the material necked and reduced in thickness to 0.114 mm, which resulted in a reduction in width of 20%.

Example 16

The sheets of Example 14 and 15 were then thermoformed into various molds using a Formech 450 vacuum molding unit. Heater output and dwell time were controlled directly on the Formech Unit and Sheet temperature and measured using a hand held non-contact infrared thermometer. The thermoforming conditions are provided in the table below.

| Sheet | Heater output (%) | Dwell Time (sec) | Sheet Temperature (° F.) |
|---|---|---|---|
| EXAMPLE 14 | 83 | 25 | 185 |
| EXAMPLE 14 | 83 | 25 | 267 |
| EXAMPLE 14 | 83 | 25 | 266 |
| EXAMPLE 14 | 83 | 25 | 279 |
| EXAMPLE 14 | 83 | 25 | 265 |
| EXAMPLE 15 | 66 | 15 | 125 |
| EXAMPLE 15 | 66 | 15 | 213 |
| EXAMPLE 15 | 66 | 15 | 165 |
| EXAMPLE 15 | 66 | 15 | 217 |
| EXAMPLE 15 | 66 | 15 | 221 |

Example 17

The sheet from Example 9 was uniaxially drawn using a Machine Direction Orientation Line (Windmoller & Holscher, Lengerich, Germany) and at a ratio of 1.5× (based on the winder speed divided by in the MDO infeed roll speed). Draw was applied in two zones at a temperature of 43° C.

Example 18

A sheet was formed as described in Example 9, except that the speed of the casting roll was increased on to reduce the sheet thickness to 0.30 mm.

Example 19

The sheet of Example 18 was uniaxially drawn using a Machine Direction Orientation Line (Windmoller & Holscher, Lengerich, Germany) and at a ratio of 1.5× (based on the winder speed divided by in the MDO infeed roll speed). Draw was applied in two zones at a temperature of 46° C.

Example 20

The sheet of Example 18 was uniaxially drawn using a Machine Direction Orientation Line (Windmoller & Holscher, Lengerich, Germany) and at a ratio of 1.75× (based on the winder speed divided by in the MDO infeed roll speed). Draw was applied in two zones at a temperature of 46° C.

Example 21

The sheet of Example 18 was uniaxially drawn using a Machine Direction Orientation Line (Windmoller & Holscher, Lengerich, Germany) and at a ratio of 2.0× (based on the winder speed divided by in the MDO infeed roll speed). Draw was applied in two zones at a temperature of 46° C.

Example 22

A sheet was formed as described in Example 9, except that the polymer throughput through the single screw extruder was reduced and the casting roll line speed was increased to create a sheet with a thickness of 0.25 mm.

Example 23

The sheet of Example 22 was uniaxially drawn using a Machine Direction Orientation Line (Windmoller & Holscher, Lengerich, Germany) and at a ratio of 1.5× (based on the winder speed divided by in the MDO infeed roll speed). Draw was applied in two zones at a temperature of 46° C.

Example 24

The sheet of Example 22 was uniaxially drawn using a Machine Direction Orientation Line (Windmoller & Holscher, Lengerich, Germany) and at a ratio of 1.75× (based on the winder speed divided by in the MDO infeed roll speed). Draw was applied in two zones at a temperature of 46° C.

Example 25

The sheet of Example 22 was uniaxially drawn using a Machine Direction Orientation Line (Windmoller & Holscher, Lengerich, Germany) and at a ratio of 2.0× (based on the winder speed divided by in the MDO infeed roll speed). Draw was applied in two zones at a temperature of 46° C.

Example 26

A sheet was formed as described in Example 9, except that the polymer throughput through the single screw extruder was further reduced and the casting roll line speed was increased to create a sheet with a thickness of 0.20 mm.

Example 27

The sheet of Example 26 was uniaxially drawn using a Machine Direction Orientation Line (Windmoller & Holscher, Lengerich, Germany) and at a ratio of 1.5× (based on the winder speed divided by in the MDO infeed roll speed). Draw was applied in two zones at a temperature of 46° C.

Example 28

The sheet of Example 26 was uniaxially drawn using a Machine Direction Orientation Line (Windmoller & Holscher, Lengerich, Germany) and at a ratio of 17.5× (based on the winder speed divided by in the MDO infeed roll speed). Draw was applied in two zones at a temperature of 46° C.

Example 29

The sheet of Example 26 was uniaxially drawn using a Machine Direction Orientation Line (Windmoller & Holscher, Lengerich, Germany) and at a ratio of 2.0× (based on the winder speed divided by in the MDO infeed roll speed). Draw was applied in two zones at a temperature of 46° C.

Example 30

A sheet was formed as described in Example 9, except that the polymer throughput through the single screw extruder was increased and the casting roll line speed was decreased to create a sheet with a thickness of 0.76 mm.

Example 31

The sheet of Example 30 was uniaxially drawn using a Machine Direction Orientation Line (Windmoller & Holscher, Lengerich, Germany) and at a ratio of 1.5× (based on the winder speed divided by in the MDO infeed roll speed). Draw was applied in two zones at a temperature of 46° C.

The following table represents thermoforming data for non-porous sheet material from Examples 9, 18, 20 and 22. All samples were produced on a thermoforming unit utilizing an oven with an infrared heater to warm the sheet material prior to forming. Sheet temperature is controlled by setting the output of the heater unit from 0 to 100% and holding the sheet material in the oven for a given dwell time. The former utilizes a single sheet of material at the thickness indicated. Sheet temperature was measured using a single use temperature indicating stickers in a range of 60 to 82° C., 88 to 110° C. and 116 to 138° C.

| Sheet | Thickness (mm) | Dwell Time (seconds) | Heater setting (%) | Temperature (° C.) |
|---|---|---|---|---|
| EXAMPLE 9 | 0.015 | 6 | 50 | 93 |
| EXAMPLE 9 | 0.015 | 5 | 45 | 88 |
| EXAMPLE 9 | 0.015 | 5 | 45 | 82 |
| EXAMPLE 9 | 0.015 | 6 | 45 | 88 |
| EXAMPLE 18 | 0.012 | 6 | 45 | 88 |
| EXAMPLE 18 | 0.012 | 5 | 45 | 88 |
| EXAMPLE 20 | 0.01 | 5 | 45 | 93 |

| Sheet | Thickness (mm) | Dwell Time (seconds) | Heater setting (%) | Temperature (° C.) |
|---|---|---|---|---|
| EXAMPLE 20 | 0.01 | 4 | 45 | 88 |
| EXAMPLE 20 | 0.01 | 3 | 45 | 71 |
| EXAMPLE 20 | 0.01 | 2 | 45 | 66 |
| EXAMPLE 20 | 0.01 | 1 | 45 | 60 |
| EXAMPLE 22 | 0.008 | 4 | 45 | 88 |
| EXAMPLE 22 | 0.008 | 3 | 50 | 88 |
| EXAMPLE 22 | 0.008 | 2 | 45 | 71 |
| EXAMPLE 22 | 0.008 | 1 | 45 | 60 |
| EXAMPLE 22 | 0.008 | | 0 | 25 |
| EXAMPLE 9 | 0.015 | 5 | 45 | 88 |
| EXAMPLE 9 | 0.015 | 5 | 45 | 88 |
| EXAMPLE 9 | 0.015 | 6 | 45 | 82 |
| EXAMPLE 9 | 0.015 | 7 | 45 | 82 |
| EXAMPLE 22 | 0.008 | 7 | 45 | 116 |
| EXAMPLE 22 | 0.008 | 4 | 45 | 88 |
| EXAMPLE 9 | 0.015 | 6 | 45 | 82 |
| EXAMPLE 9 | 0.015 | 7 | 45 | 93 |
| EXAMPLE 9 | 0.015 | 8 | 45 | 93 |
| EXAMPLE 9 | 0.015 | 8 | 45 | 93 |
| EXAMPLE 20 | 0.01 | 6 | 45 | 104 |
| EXAMPLE 20 | 0.01 | 4 | 45 | 82 |
| EXAMPLE 20 | 0.01 | 5 | 45 | 88 |
| EXAMPLE 20 | 0.01 | 5 | 45 | 88 |
| EXAMPLE 9 | 0.015 | 6 | 45 | 82 |
| EXAMPLE 9 | 0.015 | 7 | 45 | 88 |
| EXAMPLE 18 | 0.012 | 6 | 45 | 88 |
| EXAMPLE 18 | 0.012 | 6 | 45 | 88 |
| EXAMPLE 20 | 0.01 | 5 | 45 | 88 |
| EXAMPLE 20 | 0.01 | 5 | 45 | 88 |
| EXAMPLE 22 | 0.008 | 4 | 45 | 88 |
| EXAMPLE 22 | 0.008 | 4 | 45 | 88 |
| EXAMPLE 9 | 0.015 | 7 | 45 | 88 |
| EXAMPLE 9 | 0.015 | 7 | 45 | 88 |
| EXAMPLE 18 | 0.012 | 6 | 45 | 93 |
| EXAMPLE 18 | 0.012 | 6 | 45 | 93 |
| EXAMPLE 20 | 0.01 | 5 | 45 | 93 |
| EXAMPLE 20 | 0.01 | 5 | 45 | 93 |
| EXAMPLE 22 | 0.008 | 4 | 45 | 88 |
| EXAMPLE 22 | 0.008 | 4 | 45 | 88 |
| EXAMPLE 9 | 0.015 | 7 | 45 | 88 |
| EXAMPLE 9 | 0.015 | 8 | 45 | 93 |
| EXAMPLE 9 | 0.015 | 8 | 45 | 93 |
| EXAMPLE 9 | 0.015 | 9 | 45 | 99 |
| EXAMPLE 9 | 0.015 | 9 | 45 | 99 |
| EXAMPLE 18 | 0.012 | 8 | 45 | 99 |
| EXAMPLE 18 | 0.012 | 8 | 45 | 99 |
| EXAMPLE 20 | 0.01 | 7 | 45 | 99 |
| EXAMPLE 20 | 0.01 | 7 | 45 | 99 |
| EXAMPLE 22 | 0.008 | 6 | 45 | 99 |
| EXAMPLE 22 | 0.008 | 6 | 45 | 99 |
| EXAMPLE 22 | 0.008 | 7 | 45 | 104 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A thermoformed article that is formed from a polymeric sheet having a thickness of from about 0.1 to about 100 millimeters, wherein the polymeric sheet contains a thermoplastic composition that includes a continuous phase that includes a matrix polymer,
wherein a polymeric microinclusion additive is present in an amount of from 1 wt. % to 20 wt. % based on the weight of the thermoplastic composition and a polymeric nanoinclusion additive is present in an amount of from 0.01 wt. % to 15 wt. % based on the weight of the thermoplastic composition,
wherein the microinclusion addition and the nanoinclusion additive are dispersed within the continuous phase in the form of discrete domains,
wherein a porous network is defined in the composition that includes a plurality of nanopores having an average cross-sectional dimension of about 800 nanometers or less, and
wherein the polymeric sheet exhibits a machine direction and/or a cross-machine direction tensile modulus of from 100 MPa to 2,500 MPa, as determined in accordance with ASTM D638-10 at 23° C.

2. The thermoformed article of claim 1, wherein the nanopores have an average cross-sectional dimension of from about 1 to about 500 nanometers and/or an average axial dimension of from about 100 to about 5000 nanometers.

3. The thermoformed article of claim 1, wherein the total pore volume of the composition is from about 15% to about 80% per cubic centimeter.

4. The thermoformed article of claim 1, wherein the nanopores constitute about 15 vol. % or more of the total pore volume of the composition.

5. The thermoformed article of claim 1, wherein:
the continuous phase constitutes from about 75 wt. % to about 98 wt. % of the thermoplastic composition;
the microinclusion additive constitutes from about 5 wt. % to about 20 wt. % of the composition, based on the weight of the continuous phase; and/or
the nanoinclusion additive constitutes from about 0.1 wt. % to about 10 wt. % of the composition, based on the weight of the continuous phase.

6. The thermoformed article of claim 1, wherein the composition is free of gaseous blowing agents.

7. The thermoformed article of claim 1, wherein the porous network further includes micropores having an average cross-sectional dimension of from about 0.5 to about 30 micrometers and/or an aspect ratio of from about 1 to about 30.

8. The thermoformed article of claim 1, wherein the porous network is distributed in a homogeneous fashion throughout the composition.

9. The thermoformed article of claim 1, wherein the nanopores are distributed in parallel columns.

10. The thermoformed article of claim 1, wherein the micro-scale domains have an average cross-sectional dimension of from about 0.5 to about 250 micrometers.

11. The thermoformed article of claim 1, wherein the sheet is multi-layered and contains a core layer and at least one outer layer, wherein the core layer, the outer layer, or both contain the thermoplastic composition.

12. The thermoformed article of claim 1, wherein the sheet has a thickness of from about 0.4 to about 60 millimeters.

13. The thermoformed article of claim 1, wherein the continuous phase constitutes from 60 wt. % to 99 wt. % of the thermoplastic composition.

14. The thermoformed article of claim 1, wherein the matrix polymer includes a polyester or polyolefin.

15. The thermoformed article of claim 14, wherein the polyester includes polylactic acid or polyethylene terephthalate.

16. The thermoformed article of claim 1, wherein the microinclusion additive includes a polyolefin.

17. The thermoformed article of claim 16, wherein the polyolefin includes a propylene homopolymer, propylene/α-olefin copolymer, or a combination thereof.

18. The thermoformed article of claim 1, wherein the nanoinclusion additive is a functionalized polyolefin.

19. The thermoformed article of claim 18, wherein the functionalized polyolefin is a polyepoxide.

20. The thermoformed article of claim 1, wherein the thermoplastic composition further comprises an interphase modifier.

21. The thermoformed article of claim 20, wherein the interphase modifier constitutes from about 0.1 wt. % to about 20 wt. % of the composition based on the weight of the continuous phase.

22. The thermoformed article of claim 20, wherein the interphase modifier comprises a silicone, silicone-polyether copolymer, aliphatic polyester, aromatic polyester, alkylene glycol, alkane diol, amine oxide, fatty acid ester, or a combination thereof.

23. A method for thermoforming the article of claim 1, the method comprising:
   heating the polymeric sheet to a temperature above the glass transition temperature of the thermoplastic composition;
   supplying the heated polymeric sheet to a thermoforming mold; and
   shaping the polymeric sheet within the mold.

24. The method of claim 23, wherein the sheet is drawn to a draw ratio of from about 1.1 to about 3.5 and wherein the polymeric sheet exhibits a machine direction and/or cross-machine direction peak stress of from 5 to 65 MPa.

25. The method of claim 23, wherein the sheet is drawn at a temperature at least about 10° C. below the glass transition temperature of the matrix polymer.

26. The method of claim 23, wherein the sheet is heated at a temperature of from about 30° C. to about 150° C.

27. The method of claim 23, wherein the sheet is trimmed after being shaped.

28. The method of claim 23, wherein the polymeric sheet is drawn prior to being supplied to the thermoforming mold.

29. The method of claim 28, wherein the polymeric sheet is drawn at a temperature that is lower than the glass transition temperature of the matrix polymer.

* * * * *